Aug. 16, 1927.
H. H. RAYMOND
BALL BEARING HINGE
Original Filed Dec. 14, 1923
1,639,634
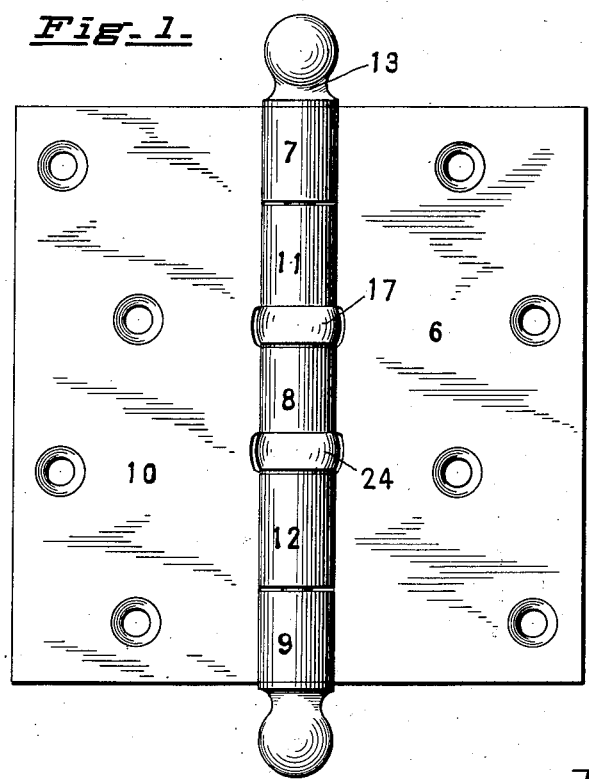
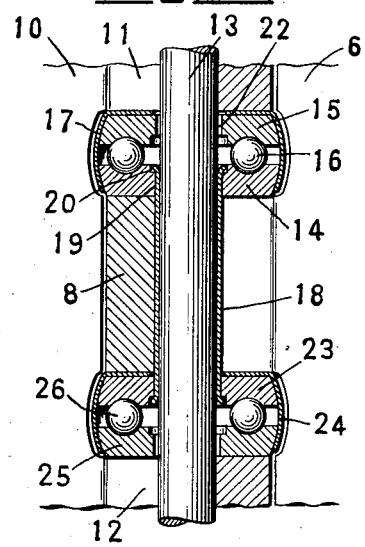
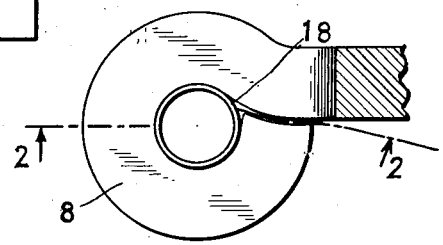
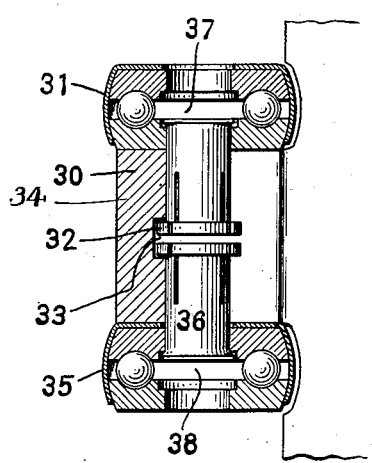
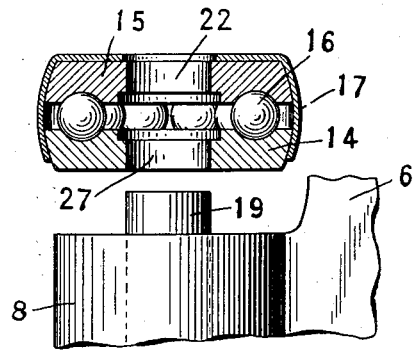
INVENTOR
H. H. Raymond,
BY
ATTORNEY Patented Aug. 16, 1927.

1,639,634

UNITED STATES PATENT OFFICE.

HORACE HOVEY RAYMOND, OF BERLIN, CONNECTICUT, ASSIGNOR TO THE STANLEY WORKS, OF NEW BRITAIN, CONNECTICUT, A CORPORATION OF CONNECTICUT.

BALL-BEARING HINGE.

Original application filed December 14, 1923, Serial No. 680,600. Divided and this application filed August 26, 1926. Serial No. 131,662.

My invention relates particularly to door hinges or butts and this application is a division of 680,600 filed December 14, 1923.

One object is to reduce the friction to a minimum.

One object is to provide a simple but reliable construction which can easily be handled without losing the parts.

Another object is to provide a construction which is cheap but durable. Another object is to provide a hinge which can be reversed. Another object is to provide a hinge which can be readily lubricated.

Another object is to provide a bearing in which the balls at one end of a knuckle may be replaced without disturbing those at the other end.

In the preferred form the bearing unit is held in place by a sleeve or tube spun over or upset over the inner edge of the unit leaving the outer washer free to rotate.

Fig. 1 is a side view of a hinge embodying my invention.

Fig. 2 is a vertical section of a fragment on the plane of the line 2—2 of Figure 4.

Fig. 3 is a side view and section showing a fragment of one hinge knuckle and its sleeve and a bearing unit.

Fig. 4 is a plan view of one knuckle and its sleeve.

Fig. 5 is a vertical sectional view of a modification.

In the form shown the leaf 6 has knuckles 7, 8 and 9 and leaf 10 has knuckles 11 and 12 and they are held together by a removable pintle 13 usually locked or secured to the upper knuckle 7 so as to turn or remain stationary with the leaf which carries it as is customary.

Each bearing unit consist of an inner hardened washer 14 and an outer washer 15 with balls 16 between them and enclosed by a housing or casing 17 which embraces the edges but is loose enough to permit the outer washer to turn freely. This housing may have any finish desired. It covers the sides of the space between the washers so as to keep out dirt and keep in the lubricating material commonly employed. The bearing unit is held in place on the knuckle 8 by the sleeve or tube 18, the end 19 of which is turned over at 20 into the locking recess 21 at the inner edge of the inner washer 14. This holds the washer 14 against the knuckle 8 in which the sleeve is mounted so that there is no relative movement between the pintle 13, the sleeve 18 and the lower bearing washer 14. It will be seen that there is a space 22 in the upper or outer washer 15 through which a lubricant can be inserted into the ball bearing when the pintle is removed. The load from the knuckle 11 is carried by the upper washer 15 and thence to the balls 16, washer 14 and knuckle 8.

Preferably another bearing unit is mounted on the lower end of the knuckle 8. The sleeve 18 serves to hold the washer 23 in place in the same manner as it holds the washer 14. The housing 24 holds the washer 25 and encloses the balls 26. In case the leaf 10 is fixed and the door is carried by the leaf 6 the principal load of course will come on this lower bearing unit.

In the form shown in Figure 5, the tube or sleeve 30 which holds the upper unit 31 has spring fingers 32 which engage in a recess 33 in the knuckle 34. The lower unit 35 is similarly held by a split sleeve 36. In each case the bearing unit has an opening 37 or 38 for access.

Ordinarily the bearing unit will be completely assembled before attachment to the knuckle. The inner washer however, can be attached first and the balls, outer washers and housing added. The housing can be removed by springing it slightly so as to replace balls if needed.

I claim:

1. A hinge consisting of leaf members having overlapping knuckles, a pintle and a bearing unit on the pintle between the knuckles said bearing unit having a passage and comprising two bearing washers, ball members between the washers and a housing holding the washers together, and a tube secured within one knuckle and having one end extending part way through the bearing unit and flanged within the bearing unit to hold it in place and leaving the inner edge of the outer washer free to permit lubrication of the ball members and races without disengaging the bearing unit from the tube.

2. A hinge comprising a leaf having a knuckle with a passage, a bearing unit on the knuckle comprising top and bottom washers, balls between the washers and a housing enclosing the outer edges of the washers, the bottom washer resting directly on said knuckle, and a tube within said passage having its upper end secured to the bottom washer and leaving the top washer free to turn and a pintle extending through said tube and spaced away from the top washer.

3. A hinge comprising a leaf having a knuckle with a passage therethrough, a ball bearing unit mounted on each end of the knuckle, each unit consisting of inner and outer members, balls between the members and means for securing the members together, the inner members engaging the ends of the knuckle, a sleeve within the knuckle passage having its ends projecting into the inner members of the bearing units and flanged over to hold them in place, the outer members being free to turn independently of said sleeve.

4. A hinge comprising a leaf having a knuckle with a passage therethrough, a bearing unit mounted on one end of said knuckle and consisting of an inner and an outer member with balls between them, the inner member having an opening with a locking edge faced away from the knuckle, a sleeve in the knuckle having its outer end projecting into the opening in the inner bearing member and spread outwardly to overstand said locking edge within said bearing unit and leaving the outer member free.

5. A hinge comprising leaves having interfitting knuckles, bearing washers mounted on opposite ends of one knuckle, a sleeve in said knuckle having its ends turned over the inner edges of said washers to hold them to said knuckle, an outer bearing washer arranged between each of the inner washers and the adjacent knuckle, ball bearings between the outer and inner bearing washers and a pintle securing said knuckles in alinement, said sleeve and the connected inner washers turning with the pintle and the outer washers turning with the adjacent knuckles.

6. A hinge comprising leaf members having over-lapping knuckles with aligned passages, a ball bearing unit between adjacent overlapping knuckles and with a passage in alignment with the passages in said adjacent knuckles and comprising an outer bearing with respect to one of said knuckles, and other parts including an inner bearing, a series of balls between the bearings and an external housing holding said outer and inner bearings together, and means for securing said bearing unit to the corresponding adjacent knuckle including a tube within and extending from the passage of such adjacent knuckle and interlocking with one of said other parts while leaving said outer bearing free to turn with the other knuckle independently of the tube.

7. A hinge comprising leaf members having overlapping knuckles with aligned passages therein, an anti-friction bearing unit between adjacent overlapping knuckles and having a passage in alignment with the aligned passages in said adjacent knuckles and comprising two bearing members, devices adapted to roll between said bearing members and a housing enclosing the outer edges of and holding said bearing members together, means for securing said bearing unit to one of said adjacent knuckles including means separate from and within the passage walls in such knuckle and extending therefrom into the passage in the bearing unit and interlocking with an inner portion of said bearing unit while leaving the outer bearing member free to turn with the other of said adjacent knuckles, and a pintle connecting said adjacent knuckles and passing through said bearing unit.

8. A hinge comprising leaf members having overlapping knuckles with aligned openings, a bearing unit between adjacent overlapping knuckles and comprising two bearing members with devices adapted to roll between said bearing members and a housing holding said bearing members together and enclosing the rolling devices, and means for securing said bearing unit to one of said adjacent knuckles including a separately formed tubular member secured within such knuckle and extending therefrom only part way through the bearing unit and part way to the inner surface of the outer bearing member and formed to overstand an inner portion of said bearing unit and hold it in place relative to the knuckle while leaving the outer bearing member free and a pintle connecting said knuckles and passing through said bearing unit.

HORACE HOVEY RAYMOND.